June 21, 1949.  J. W. BROWN, JR  2,473,783
PORTABLE HEATER
Filed Oct. 12, 1946  2 Sheets-Sheet 1
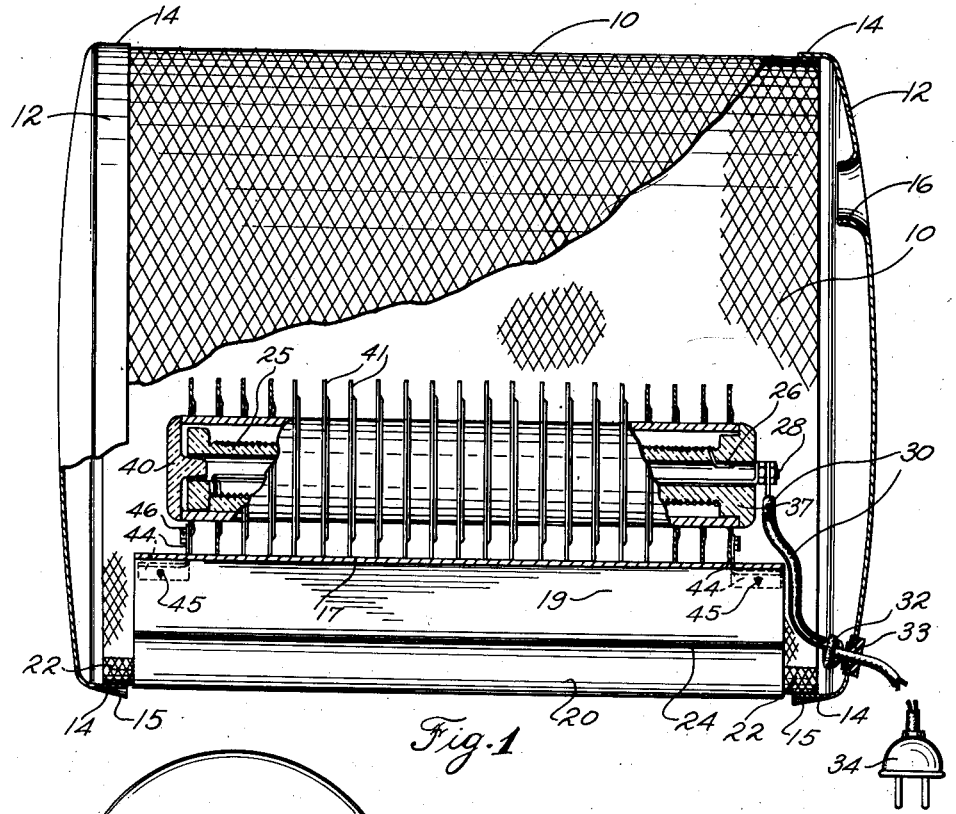
Fig.1
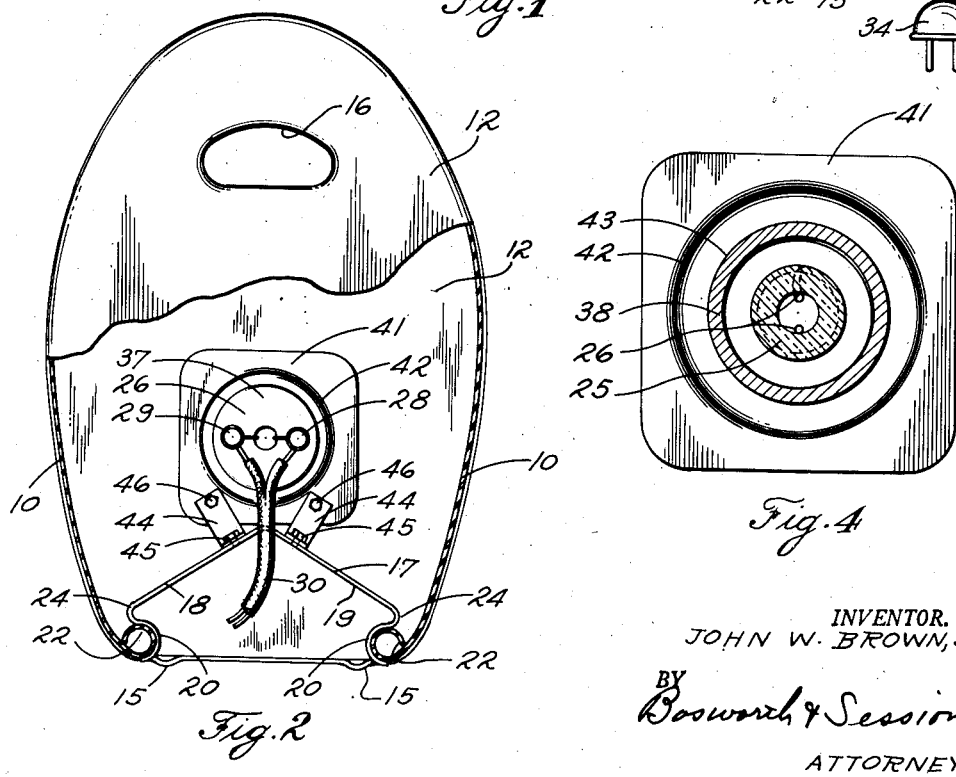
Fig.2
Fig.4
INVENTOR.
JOHN W. BROWN, JR
BY
Bosworth & Sessions
ATTORNEYS

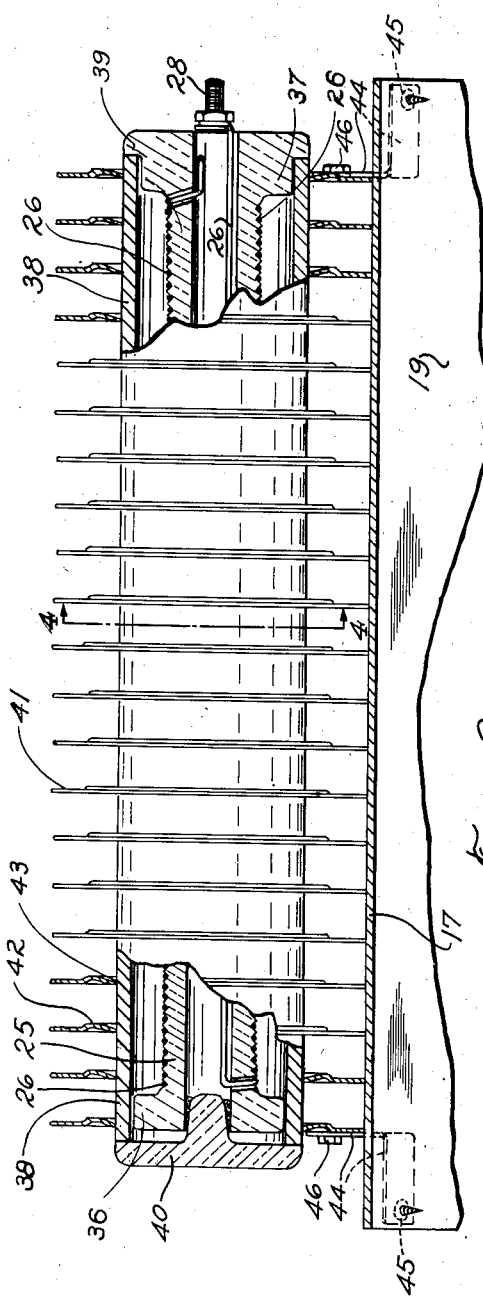
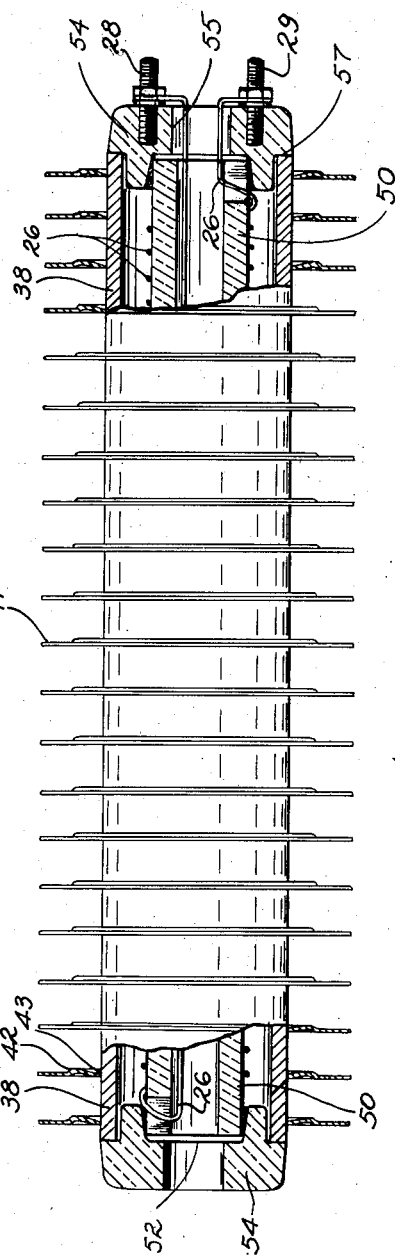

Patented June 21, 1949

2,473,783

UNITED STATES PATENT OFFICE 2,473,783

PORTABLE HEATER

John W. Brown, Jr., Lakewood, Ohio, assignor to Brown Fintube Company, Elyria, Ohio, a corporation of Ohio Application October 12, 1946, Serial No. 703,019

3 Claims. (Cl. 219—38)

This invention relates to an electric heater and more particularly to a portable heater of the type used in homes to supplement the household heating system.

Electric household heaters, particularly those of the portable type, should embody a maximum of heating efficiency and yet be competitive in cost with numerous other heaters that are available. Such heaters should be safe to use and so constructed that the parts that carry electric current, or that are heated to elevated temperatures, may not be touched inadvertently, particularly by children. The heater should be attractive in appearance, easily cleaned and easily disassembled for repair or replacement of parts such as a defective heater element.

It is a general object of the present invention to provide an improved electric heater of the convection type that is more economical to construct, safer to use and possessed of a greater heating efficiency than prior known devices of this type. A further object is to provide a heater in which no exposed parts either carry electric current or are heated to a temperature dangerous to the touch. Another object of the invention is to provide a convection heater in which air circulates past and is heated by a surface of large area that in turn is raised to an elevated temperature by a shielded electric resistance heating element. An additional object of the invention is to provide a heater in which the heating element may easily be removed from a supporting enclosure to permit access to the parts for cleaning and like purposes. Still another object of the invention is to provide an enclosed heater in the outer case of which perforations are made by expanding the material from which it is formed to permit air to circulate freely therethrough and become warmed by the heating element.

Other objects of the invention will become apparent from the following description of the embodiments illustrated in the attached drawings. The novel features of the invention are set forth in the appended claims.

Referring now to the drawings: Figure 1 is a side elevation, partially in section, of a heater embodying the present invention; Figure 2 is an end elevation, also partly in section, of the heater illustrated in Figure 1; Figure 3 is an elevation on an enlarged scale and shown in section at the ends, of a preferred form of finned heating assembly employed with my invention; Figure 4 is a section through Figure 3 as indicated by the lines 4—4 thereon; and, Figure 5 is a view similar to Figure 3 but showing a modified form of finned heating assembly.

In general my improved heater comprises an elongated resistance heating element that is mounted within a heat conducting tube to which are secured a plurality of heat radiating fins. Heat is transmitted from the element to the tube and from the tube to the fins to provide a large convection heating area that includes the exterior of the tube and both sides of each of the fins. As air circulates over this area it becomes heated and moves upwardly out of the heater and on to heat the room in which the heater is placed. The finned heater element assembly is mounted on a reflector plate that lies beneath it and is generally concave upwardly across its width normal to the element axis and straight along its length. This plate serves both as a surface from which heat is reflected outwardly into the room to be heated, and as a supporting member for the assembly. At its opposite long edges the plate is formed to engage and grip a perforated, preferably expanded metal, case that overlies the entire heater assembly to protect it and yet permit heated air to circulate freely through it to warm the room. End covers are secured to the open ends of the case to form a rigid enclosure and are provided with hand grips for ease in handling. The supporting plate is manually flexible to permit it to be distorted and positioned in the enclosure and then released to interlock with the case and form the completely assembled heater.

Referring to the construction in detail and particularly to Figure 1 it will be seen that the heater comprises an outer metal case 10 to which are secured end covers 12 flanged as at 14 to be press fitted over the open ends of the case and welded to it. The end covers are provided at their bottoms with deformations 15 that act as feet on which to stand the heater. They are also each provided with a generally elliptical hand grip opening 16 by which the heater may be lifted and transported.

To permit circulation of air freely through the case 10 and over the heater assembly the case is perforated across substantially its entire surface to provide a grill as indicated in Figure 1. This grill preferably is provided by forming the case of expanded metal, although other materials, such as, for example, sheet metal with a large number of openings punched therein or wire screening may be used if desired.

The case 10 is removably connected to a deflector plate 17 that also supports the heater element assembly as shown in cross section in Figure 2. This plate is formed of a sheet of flat metal bent along a line parallel to the heater element to reenforce it and provide a pair of heat reflecting surfaces 18 and 19 such that the plate is generally convex upwardly across its width and straight along its length although it will be apparent that it may be formed to other shapes as desired. At its opposite long straight edges the deflecting plate is inwardly formed as at 20 to provide channels for the reception of enlarged complementary beaded edges 22 integral with and formed by overturning corresponding edges of the case 10. The thickness of the sheet from which the plate is formed is such that it is reasonably stiff but is manually deformable to permit the channels to be pressed toward each other for insertion into the top enclosure.

The deflector plate is secured to the case 10 to provide a unitary assembly with the entire top enclosure. This is accomplished by inserting one of the beaded edges 22 into a complementary channel 20 and then manually deforming the plate 17 to bring the two channels closer to each other and permit the other complementary channel and bead to be snapped together. This construction permits the plate to be easily removed from the top enclosure and allow access to its interior for cleaning or for other purposes. In the same way access may be had to the heating element assembly that is mounted on the plate 17 and normally encased by the top enclosure when the heater is assembled.

The heater element assembly is mounted on the plate 17 as shown in Figures 3 and 4. This assembly includes a ceramic or other dielectric core 25 threaded as indicated to receive a coil 26 of resistance wire through which the heating current is passed and by which the electrical energy is converted to the heat that is dissipated by the heater. The leads of the coil 26 are connected to binding posts 28 and 29 respectively and there make connection with a two lead insulated cable 30. This cable is knotted as at 32 and then passes through a rubber grommet 33 in the right-hand end cover (Figure 1) to connect to an ordinary pronged household plug 34 adapted to make connection with an ordinary 110 volt household current source.

The dielectric core 25 is provided at each end with enlarged annular shoulders 36 and 37 that are snugly received within the ends of a steel tube 38 extending from one end of the core to the other and overlying the coil 26. At one end of the core the shoulder 37 merges with an enlarged end 39 that acts as an end stop for one end of the tube to hold it in position axially with respect to the core. The other end of the core is capped by a ceramic end cap 40 that seats snugly within the bore of the core 25 and overlies the adjacent end of the tube 38. The core 25, the tube 38 and the end cap 40 are all closely fitted together to form the completed heater element assembly and the ceramic parts are cemented together. If desired a rod may be passed through the cap 40 and the bore of the core 25 to insure that the parts will not come apart during use.

Heat generated due to the electrical resistance of the coil is transmitted directly to the tube 38 and from it to a series of radiating fins. These fins, as indicated at 41, each comprise a generally dish shaped steel plate of substantially rectangular outer shape (Figure 4) and are centrally blanked out to slide over and form a tight fit with the exterior surface of the tube 38. To facilitate their mounting and retention on the tube each fin is formed as shown in cross section in Figure 3 to provide a recess 42 and a somewhat resilient lip 43 in the region of contact with the tube 38. The fins may be brazed onto the tube to insure the most efficient degree of heat transfer from the tube to the fins, or if a more economical construction is desired the fins may be pressed over the end of the tube in which case they are held in place by the resiliency of the respective lips 43.

The tube 38, core 25 and fins 41 are mounted on the plate 17 by angles 44 secured to the plate at 45 and to the end fins of the heater assembly at 46.

A convection heating surface of considerable area is provided by the external surface of the tube 38 and by the two sides of each of the fins 41. This heater surface warms the air adjacent it which then rises and passes out of the heater through the openings in the case 10. Cool air takes its place and passes between the fins and through the heated region to become heated in its turn and pass on to give up heat to the surrounding objects near the heater, thus creating circulation of the air in the room in which the heater is used.

A modified form of heating element may be substituted for the preferred form described above and shown in Figure 3. In this modified construction all parts of the heater except the dielectric core heating element proper within the tube 38 are made as described above and one form of heating element is interchangeable with the other within the tube 38. This modified construction, shown in Figure 5, employs a hollow generally cylindrical dielectric core 50 generally similar to core 25 but not threaded. A resistance heating element is wound in the threaded portion and the leads are brought out to the terminals 28 and 29 in the same manner as previously described above. Each end of the core 50 seats within an annular opening 52 of a dielectric plug 54 cemented to the core 50 and that in turn is hollow as indicated at 55. An external annular shoulder 57 is formed on each plug to support an end of tube 38. This assembly of core 50, ends 54 and tube 38 are closely fitted together as shown although a fastening rod may pass through the core 50 and the hollow portions 55 of the end plugs when they are aligned as shown in Figure 5.

From the above description it will be seen that the electrical heating element is entirely insulated from the exterior of the finned assembly as well as all exposed parts of the heater. Thus it is not possible for the user inadvertently to contact the resistance wire heating element that not only passes the operating current of the heater but that also is heated to incandescence. Substantially all of the heat that is generated due to the electrical resistance of the heating coil passes first to the tube 38 and is then conducted through the lips 43 to heat the fins 41. In this way the heat from the incandescent heating element is transferred to heat the relatively large area represented by the fins and the exterior of the tube 38. These heat transfer surfaces are so large (for example, I preferably employ a finned tube having about 500 square inches of external surface in a 1350 watt heater) that the air passing over them removes heat from them at a rapid enough rate to prevent excessive heating of tube and fins. Thus relatively large volumes of air are heated to moderate temperatures, the case never becomes dangerously hot, and excellent circulation of warm air is obtained.

Most of the heat from the fins goes to raise the temperature of the air that circulates through the heater. However, some of the heat is radiated downwardly and then reflected by the convex plate 17 upwardly and outwardly into the room. In this way the upwardly convex plate, and particularly the portions 18 and 19 thereof, acts as a reflecting surface to insure that even heat directed downwardly will be efficiently used.

Various other changes and modifications may be made without departing from the spirit and scope of my invention. It is therefore to be understood that my patent is not limited to the preferred forms of the invention described herein, or in any manner other than by the scope of the appended claims.

I claim:

1. An electric heater comprising a deflector plate that is generally convex upwardly across its width and straight along its length, a case adapted to extend above the convex side of said plate and from one long edge thereof to the other, complementary pairs of beaded portions and pairs of channel portions, one pair of portions carried by said plate along the long edges thereof and the other by said case and adapted to interfit to retain said case and cover together, the distance between the said portions on the case being less when the case is removed than the distance between the portions on said plate to provide a snap fit between said beads and channels, an elongated heating element mounted on the convex side of said plate and extending lengthwise thereof and substantially midway between the pair of portions carried by said plate, and end covers overlying the open ends of said case to prevent endwise separation of said case and said plate.

2. An electric heater comprising a deflector plate that is generally convex upwardly across its width and straight along its length; a channel along each long edge of said plate formed by turning the material at the long edges under the convex portion of said plate, a case adapted to extend above and across said plate and provided at two parallel edges with beads adapted to enter said channels, the distance between said beads and the distance between said channels being such as to provide a snap fit between said beads and channels, an elongated heating element mounted on said plate lengthwise thereof and on the convex side substantially midway between said channels to enable said deflector plate to reflect heat upwardly and outwardly from said heater, said case being provided with a plurality of openings to permit free flow of air therethrough.

3. An electric heater comprising a deflector plate that is generally convex upwardly across its width and straight along its length, a channel along each long edge of said plate formed by turning the material at the long edges under the convex portion of said plate, a case adapted to extend above and across said plate and provided at two parallel edges with beads adapted to enter said channels, the distance between said beads when the case is removed being less than the distance between said channels to provide a snap fit between said beads and channels, an elongated heating element mounted on said plate lengthwise thereof and on the convex side substantially midway between said channels, a metal tube encasing said element and electrically insulated therefrom, a plurality of heat dissipating fins secured to the exterior of said tube and lying in planes transverse to the long axis of said tube, said case being provided with a plurality of openings to permit free flow of air therethrough and end covers overlying the open ends of said case.

JOHN W. BROWN, Jr.

REFERENCES CITED

The following references are of record in the file of this patent:

UNITED STATES PATENTS

| Number | Name | Date |
| --- | --- | --- |
| 1,300,172 | Jones | Apr. 8, 1919 |
| 2,062,466 | Marr | Dec. 1, 1936 |